United States Patent [19]

Uenohara

[11] Patent Number: 4,923,046
[45] Date of Patent: May 8, 1990

[54] COOLING MECHANISM OF A CLUTCH COVER ASSEMBLY

[75] Inventor: Norihisa Uenohara, Hirakata, Japan
[73] Assignee: Kabushiki Kaisha Daikin Seisakusho, Osaka, Japan
[21] Appl. No.: 196,191
[22] PCT Filed: Oct. 5, 1987
[86] PCT No.: PCT/JP87/00743
§ 371 Date: Apr. 1, 1988
§ 102(e) Date: Apr. 1, 1988
[87] PCT Pub. No.: WO88/02825
PCT Pub. Date: Apr. 21, 1988
[30] Foreign Application Priority Data
Oct. 15, 1986 [JP] Japan .................. 61-157998[U]
[51] Int. Cl.$^5$ ............................................. F16D 13/72
[52] U.S. Cl. ............................... 192/113 A; 192/89 B
[58] Field of Search ............... 192/113 A, 70.12, 89 B
[56] References Cited

U.S. PATENT DOCUMENTS 4,657,128 4/1987 Fujito et al. ..................... 192/70.12
4,667,794 5/1987 Martinez-Corral et al. ... 192/113 A

FOREIGN PATENT DOCUMENTS 3307943 9/1984 Fed. Rep. of Germany ... 192/113 A
3703663 8/1987 Fed. Rep. of Germany ... 192/113 A
5740727 9/1988 Japan .
60145625 9/1988 Japan .
WO87/07346 12/1987 PCT Int'l Appl. ............. 192/113 A
2181193 4/1987 United Kingdom ........... 192/113 A Primary Examiner—Peter R. Brown
Assistant Examiner—Brian K. Green
Attorney, Agent, or Firm—Armstrong, Nikaido, Marmelstein, Kubovcik & Murray

[57] ABSTRACT

A cooling mechanism for a clutch having a clutch cover assembly. A diaphragm spring, having openings, is provided with vanes integrally formed at edges of some of such openings and at the side of some such openings opposite to the direction of rotation of the spring. Such vanes project toward the clutch cover for feeding cooling air into the clutch cover assembly. In the driving condition, the diaphragm spring rotated and the air faced to the vanes is fed by the rotating force of the vanes through the openings to cool the friction surfaces in the clutch cover assembly.

3 Claims, 2 Drawing Sheets

COOLING MECHANISM OF A CLUTCH COVER ASSEMBLY

TECHNICAL FIELD

The present invention relates to a cooling mechanism of a clutch cover assembly of a push-type and a pull-type clutch applied to automobiles and other vehicles.

BACKGROUND ART

Referring to FIG. 3 in which a conventional clutch cover assembly is shown applied to a flywheel 11 driven by an engine (not shown), the clutch includes a clutch cover body 12 of a dish-like form having a central aperture of a large diameter. The clutch cover body 12 is provided at the inner periphery with tabs 23, which are fitted into and caulked to substantially rectangular opening 2, having round corners FIG. 4 (called merely as openings hereinafter) in a diaphragm spring 16 to support the diaphragm spring 16 on the clutch cover body 12 by means of wire rings 17, 18, FIG. 3.

The flywheel 11 and the clutch cover body 12 form an internal space 20, in which a clutch disk 13 is concentrically disposed and is connected to an output shaft, only a center line C of which is illustrated. A pressure plate 14 for pressing the clutch disk 13 toward the flywheel 11 is concentrically disposed in the internal space 20 between the disk 13 and the clutch cover body 12.

The diaphragm spring 16 which is formed by an annular metal member is used for pressing the clutch disk 13 onto the flywheel 11 by the pressure plate 14.

The diaphragm spring 16 is integrally provided at the radially outer portion with an annular spring portion 16a, and is integrally provided at the radially inner portion with many radial tongues 5, FIG. 4, extending radially inwardly from the inner periphery of said annular spring portion 16a. These tongues 5 form slits 22 therebetween. The openings 2 are formed radially outside the slits 22.

A pair of metal wire rings 17, 18 having the same radii, are pinched on opposite surfaces of the diaphragm spring 16 by the tabs 23 fitted in the openings 2, respectively.

At the side of the clutch cover body with respect to the diaphragm spring 16 is disposed a release bearing 21, which is slidable along the output shaft and is connected through a link mechanism (not shown) to a clutch pedal, so that it may push the tongues 5 of the diaphragm spring 16 toward the flywheel 11.

In the above structures, when the clutch pedal is depressed, the release bearing 21 pushes the tongues 5 of the diaphragm spring 16 toward the flywheel 11. The annular spring portion of the diaphragm sprig receives a force toward the clutch cover body and, using the wire rings 17 and 18 as fulcrum, releases the pushing force of the spring against the pressure plate 14. Thus, the clutch is released.

In the engaged condition of the clutch, the diaphragm spring 16 elastically presses the pressure plate 14 toward the flywheel 11 again using the wire rings 17, 18 as the fulcrum. The clutch disk 13 is pressed onto the flywheel 11 by the pressure plate 14. The rotational force of the flywheel 11 is transmitted to the clutch disk 13.

However, in the above structures, although the flywheel 11 and the clutch disk 13, as well as the clutch disk 13 and the pressure plate 14, frequently slide on each other to cause friction heat, they do not have a cooling function. The heat generated in the clutch disk 13 causes rapid wear of the clutch disk 13 and, in severe use condition, thermal damage to the friction member and curvature of the pressure plate 14 may result.

In order to cool these friction parts or portions structures, as shown in FIG. 4, in which edges of the tongues 5 of the diaphragm spring 16 are bent, e.g., by press machining, in opposite directions have been proposed for supplying air into the internal space through the slits 22, as shown in arrows A, when the diaphragm spring 16 rotates in the direction X. However, in order to form the tongues 5 of such shape, it is necessary to entirely modify the press dies for forming the tongues, and to form recesses 27 at portions to which the release bearing contacts. Therefore, due to the modification of the press dies, the cost increases and the manufacturing processes are complicated. The object of the invention is to overcome these problems.

DISCLOSURE OF INVENTION

The present invention, FIGS. 1 and 2, provides a cooling mechanism for a clutch cover assembly including a clutch cover body fixed to a flywheel. A diaphragm spring, having a radially outer spring portion, is pinched by a wire ring to an inner peripheral portion of the clutch cover body and is positioned at a flywheel side with respect to the clutch cover body (12). The diaphragm spring includes a plurality of radial tongues which extend radially inwardly from the inner periphery of the annular spring portion. Slits are formed between the tongues, and openings are formed radially outside the slits. Some of the openings, at edges opposite to the rotating direction of such opening are provided with vanes integrally formed with such openings, respectively. The vanes project toward the clutch cover body for feeding air into the clutch cover assembly.

BEST MODE FOR CARRYING OUT THE INVENTION

Figure 1:
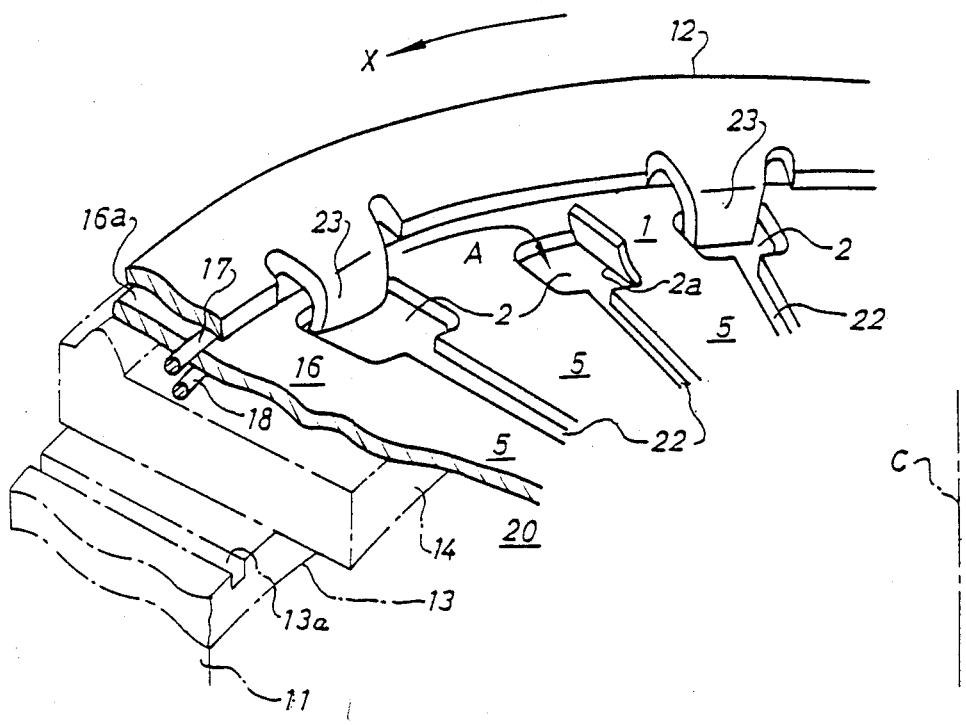
FIG. 1 is a perspective view of the present invention.

In FIG. 1, illustrating a clutch cover assembly of the present invention, a clutch cover body 12 is fixed to a flywheel 11, and is provided at the inner periphery with tabs 23 fitted into the alternate openings 2.

The flywheel 11 and the clutch cover 12 form an internal space 20, in which a clutch disk 13 and a pressure plate 14 for pressing the clutch disk 13 against the flywheel 11 are concentrically disposed. In the embodiment, in order to smoothly circulate an air fed to the friction surfaces, the clutch disk 13 is provided at opposite surfaces with radial recess grooves 13a.

A diaphragm spring 16, supported by the clutch cover body, is provided with a plurality of radial tongues 5 extending radially from the center side thereof. Slits 22 are formed between the tongues 5.

Each tongue 5 performs a function as a lever. Further, the openings 2 are formed radially outside the slits 22 and are wider than the slits 22.

Further, a pair of wire rings 17, 18 having a same diameter are disposed on opposite surfaces of the diaphragm spring 16. Tabs 23 are fitted into selected openings 2 and are caulked. The diaphragm spring 16 is supported by the clutch cover body 12.

Figure 2:
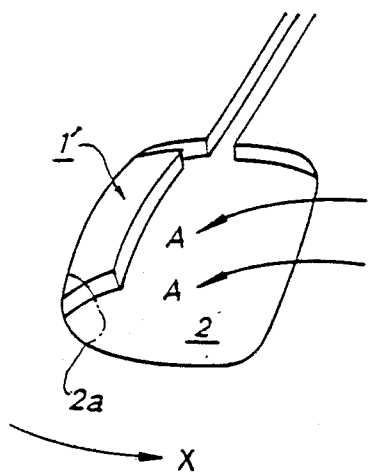
FIG. 2 is a perspective view showing another shape of a vane.
Figure 2A:
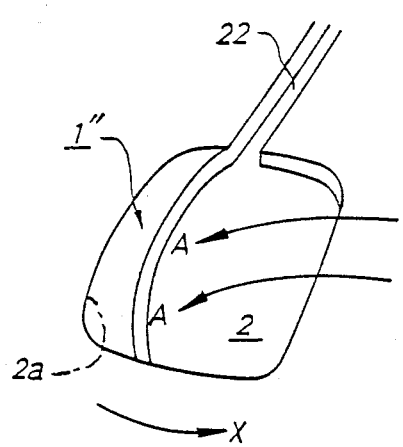
FIG. 2a is a perspective view of still another shape of the vane.
Figure 3:
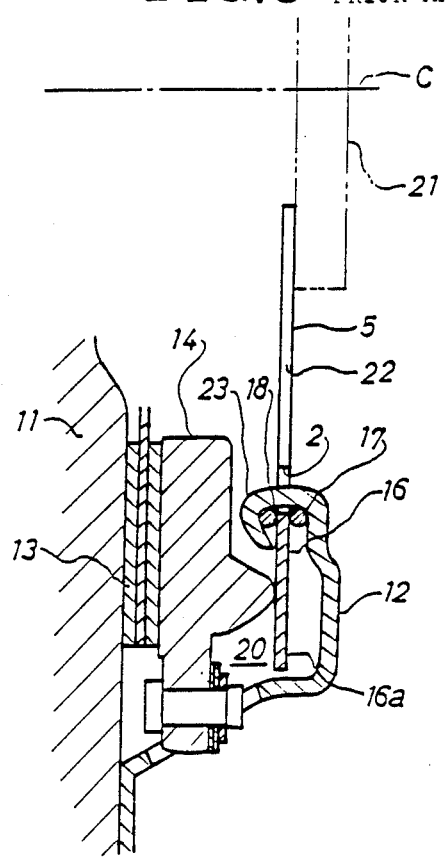
FIG. 3 is a schematic sectional view of a prior art clutch cover assembly.
Figure 4:
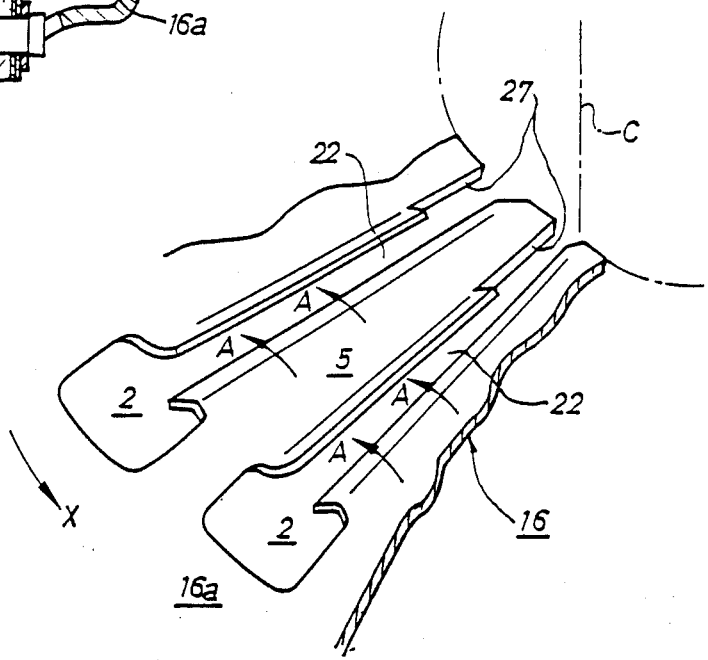
FIG. 4 is a perspective view of a diaphragm spring and illustrating of the prior art structure.

Each opening 2, into which a tab 23 is not fitted, is provided at an edge 2a positioned at an opposite side with respect to the rotating direction X with a vane 1 formed, e.g., by press forming. The vanes 1 are curved toward the clutch cover 12 at the opening 2. The vanes may have various shapes such as that of curved vanes 1' overlapping the openings 2, as shown in FIG. 2, and that of vanes 1" extending from the edge 2a to form a half-dome-like shape opening in the rotating direction X, as shown in FIG. 2a. By forming such vanes 1, 1', or 1", when the diaphragm 16 rotates in the direction X, the air faced to the vanes is fed by the rotating force of the vanes 1 through the openings 2 into the clutch cover assembly.

An operation is as follows. In a driving condition of an engine, the clutch cover body 12 rotates together with the flywheel 11. Thus, the diaphragm spring 16 supported by the clutch cover body 12 rotates in the direction X. Air faced to the vanes 1 is fed by the rotating force of the vanes 1 through the openings 2 into an internal space 20, as shown by arrows A. When the clutch is released, the air is fed to friction surfaces between the flywheel 11 and the clutch disk 13 and between the clutch disk 13 and the pressure plate 14 to absorb the heat in the friction surfaces for cooling the flywheel 11, clutch disk 13 and pressure plate 14. When the clutch is engaged, the air flows through recess grooves 13a in the clutch disk 13 to cool the clutch disk 13 which has absorbed the friction heat.

According to the invention, as described above;

(1) the air fed into the openings 2 by the vanes 1 is fed to the friction surfaces between the flywheel 11 and the clutch disk 13 and between the clutch disk 13 and the pressure plate 14, so that the heat generated in the friction surfaces are absorbed by the air for cooling. Therefore, even in severe conditions at which the clutch is frequently and repeatedly engaged and released, the friction surfaces are cooled by virtue of the cooling function. There is no problem such as thermal damage of the friction member of the clutch disk 13 and deflection or curving of the pressure plate 14.

(2) The vanes of the present invention are formed at the edges 2a of the openings adjacent to the radially outer portions of the tongues 5 of the diaphragm spring. Therefore, a distance between a center line C of an output shaft to the vanes 1 can be long, so that larger force of the radially outer portion of the diaphragm spring can be effectively utilized to feed the air to the friction surfaces.

(3) The vanes 1 used in the present invention can be formed, e.g., by cutting and bending work performed in one process simultaneously with work for forming the diaphragm spring 16 by a press machine. Therefore, they can be extremely easily machined, resulting in low machining cost.

(4) Since blank portions, which are punched out for forming the openings 2 and are abandoned in the conventional process, can be economically saved. The present invention may be applied to structures of pull type which do not require tabs and stud pins.

I claim:

1. A cooling mechanism of a clutch cover assembly including a clutch cover body fixed to a flywheel, and a diaphragm spring having a radially outer spring portion which is pinched by means of a wire ring to an inner peripheral portion of the clutch cover body and which is positioned at a flywheel side with respect to the clutch cover body, said diaphragm spring including a plurality of radial tongues which extend radially inwardly from an inner periphery of said radially outer spring portion, slits being formed between the tongues, and enlarged openings being formed radially outside the slits, each said enlarged opening having side edges tabs are formed on said clutch cover body and extend into and are caulked in some of said enlarged openings in said diaphragm spring to support said diaphragm spring on said clutch cover body, and vanes are integrally formed along at least one of the side edges of a plurality of said enlarged openings, said vanes project forwardly and upwardly to partially cover said enlarged openings for feeding air into said clutch cover assembly through said enlarged openings.

2. A cooling mechanism of a clutch cover assembly of claim 1, wherein said vanes are open ended with the open end facing outwardly in the rotation direction of said clutch from said diaphragm spring and are curved at said outwardly spaced open end.

3. A cooling mechanism of a clutch cover assembly of claim 1, said vanes are of half-dome-like shape opening in the rotation direction of said cover.

* * * * *